Figure 1:
Figure 2:
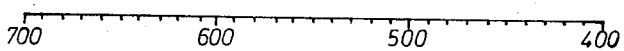
Figure 3:
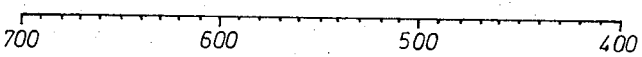
Figure 4:
Figure 5:
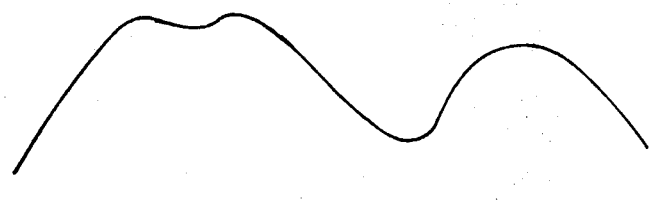
Figure 6:
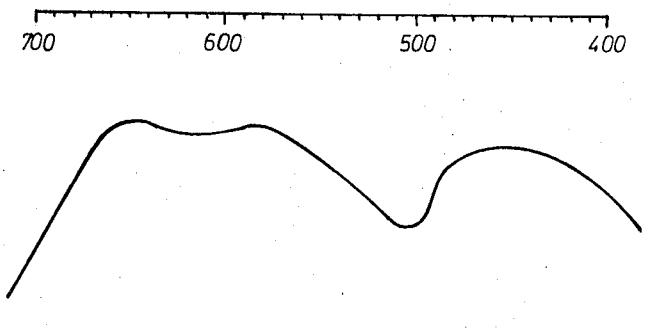
Figure 7:
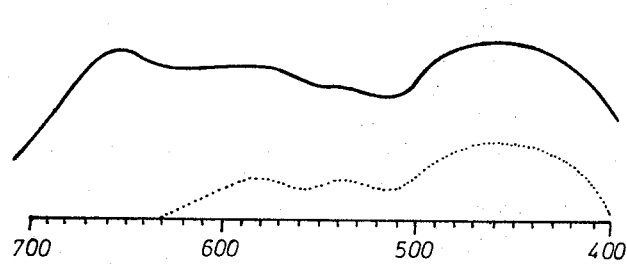

United States Patent

[11] 3,615,636

[72] Inventor Oskar Riester
 Leverkusen, Germany
[21] Appl. No. 780,651
[22] Filed Dec. 3, 1968
[45] Patented Oct. 26, 1971
[73] Assignee AGFA-Gevaert Aktiengesellschaft
 Leverkusen, Germany
[32] Priority Dec. 12, 1967
[33] Germany
[31] P 15 97 502.7

[54] SPECTRALLY SENSITIZED DIRECT POSITIVE EMULSION
 6 Claims, 7 Drawing Figs.

[52] U.S. Cl. .................................................. 96/126
[51] Int. Cl. ....................................... G03c 1/10,
 G03c 1/28
[50] Field of Search ........................................... 96/101,
 104, 90, 126

[56] References Cited
 UNITED STATES PATENTS
| | | | |
|---|---|---|---|
| 3,140,948 | 7/1964 | Stewart et al. .................. | 96/90 X |
| 3,140,949 | 7/1964 | Sprague et al. ................. | 96/90 X |
| 3,314,796 | 4/1967 | Goetze et al. .................. | 96/101 |
| 3,501,310 | 3/1970 | Illingsworth et al. ......... | 96/101 X |

FOREIGN PATENTS
| | | | |
|---|---|---|---|
| 581,773 | 10/1946 | Great Britain ................ | 96/101 |
| 655,009 | 7/1951 | Great Britain ................ | 96/101 |
| 970,601 | 9/1964 | Great Britain ................ | 96/101 |

Primary Examiner—William D. Martin
Assistant Examiner—M. R. Lusignan
Attorney—Connolly and Hutz ABSTRACT: The invention relates to photographic direct positive emulsions which are spectrally sensitized by a combination of triphenyl methane dyes and indocyanine dyes.

PATENTED OCT 26 1971

3,615,636

INVENTOR.
OSKAR RIESTER

SPECTRALLY SENSITIZED DIRECT POSITIVE EMULSION

Many sensitizing dyes are known for sensitizing the usual negative silver halide emulsions, for example, mono- or trimethine cyanines, merocyanines and rhodacyanines.

The known sensitizing dyes, however, cannot be used for sensitizing direct positive emulsions, i.e., emulsions which are processed to produce positive images after the usual exposure and development, because they usually cause a flattening of the gradation. Compounds which can only be used for sensitizing direct positive emulsions have already been described. However, these compounds cause fogging in negative emulsions and their sensitizing effect is unsatisfactory.

Dyes which have been used to sensitize direct positive emulsions are, e.g., indocyanines which have a very good sensitizing effect for the red region of the spectrum.

Sensitizing dyes which sensitize direct positive emulsions for the green region of the spectrum are e.g., described in the German Pat. No. 1,153,246. Further some triphenylmethane dyes are known as sensitizers for direct positive emulsions. But all these sensitizers are not entirely satisfactorily in their activity, for they either do not comprehend the whole visible region of the spectrum or sensitize a partial region insatisfactorily.

It is among the objects of the present invention to provide direct positive emulsions which are optically sensitized over the entire spectrum.

It has now been found that direct positive emulsions can be sensitized very satisfactorily using a combination of triphenylmethane dyes and indocyanine dyes. Suitable triphenylmethane dyes include those of the following formula I 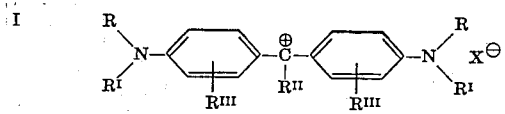

in which R or $R^I$ = a hydrogen atom, and alkyl, hydroxyalkyl, or aminoalkyl group, containing up to 6 carbon atoms, an aralkyl group, such as benzyl or phenylethyl, or an aryl group, in particular a phenyl group, in which the phenyl rings may be further substituted, e.g., by alkyl or alkoxy groups, preferably containing up to 5 carbon atoms, or by halogen atoms such as chlorine or bromine and the like; R and R' may also together represent the ring members required to form a saturated heterocyclic 5- or 6-membered ring;

$R''$ = is an aryl group such as phenyl or naphthyl which may be substituted preferably in p-position by the groups

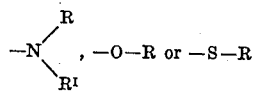, —O—R or —S—R or by a methylene dioxy group; R and R' having the same meanings as mentioned above. The aryl group may further be substituted by the group $R'''$.

$R'''$ = a hydrogen atom, an alkyl, alkoxy or alkylthio group, preferably containing up to 5 carbon atoms, an aroxy group, preferably phenoxy, or a halogen atom such as chlorine or bromine;

$X^1$ = is any inorganic or organic acid radical such as a halide, sulfate, nitrate, phosphate, alkylsulfate, alkylsulfonate, arylsulfonate, naphthalene sulfonate, oxalate, acetate, thiocyanate, perchlorate or $ZnCl_2$ double salt.

The following dyes, for example, are suitable for this purpose:

| | C.I. Number |
|---|---|
| I,1 Brilliant Green | 42 040 |
| I,2 Malachite Green | 42 000 |
| I,3 Methyl Green | 42 950 |
| I,4 Victoria Blue B | 42 595 |
| I,5 Ethyl Violet | 42 600 |
| I,6 Crystal Violet | 42 555 |
| I,7 Parafuchsine | 42 500 |
| I,8 Spirit Blue | 42 775 |
| I,9 Methyl Violet | 42 535 |
| I,10 Rosaniline | 42 520 |

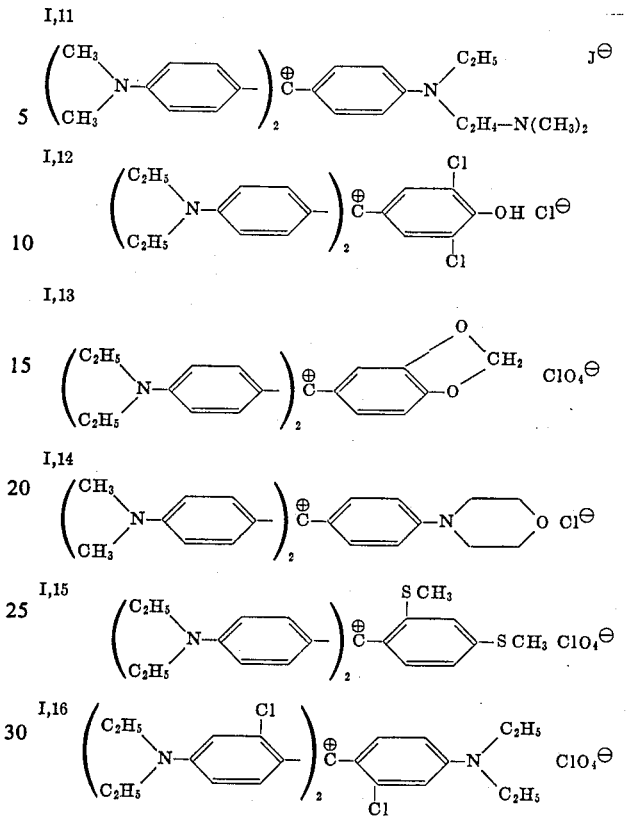

Some of the above dyes are known. They can be prepared by known methods. Dye I,11 is prepared for example by reaction of N-ethyl-N-(2-dimethylaminoethyl)-aniline and Michler's ketone in presence of $POCl_3$. The other dyes are prepared in analogous manner.

Particular utility of the indocyanine dyes used in combination with the same triphenylmethane dyes is exhibited by those of the following formula II:

II 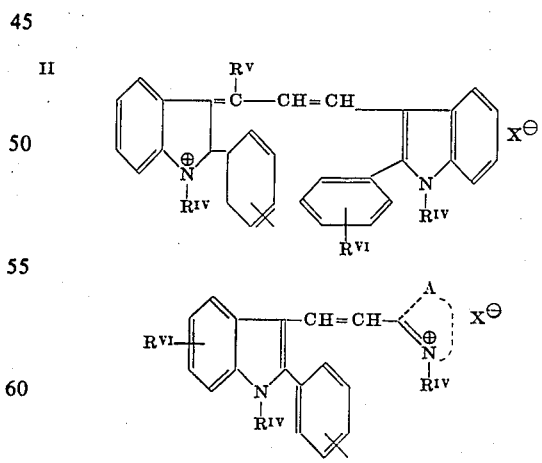

in which $R''$ is an alkyl group preferably with up to five carbon atoms; $R'$ is a hydrogen atom, an alkyl group preferably with up to five carbon atoms, a heterocyclic group, especially indol or thienyl or a radical of the phenyl series; $R''$ is a hydrogen atom, an alkyl or alkoxy group, preferably with up to five carbon atoms, an aryl or a halogen atom such as chlorine or bromine; A represents a group required to complete a heterocyclic group having one or more nuclei which can be substituted; $X^1$ is any organic or inorganic anion, the nature of the anion is unimportant.

The following dyes are useful in combination with triphenylmethane dyes:
II. 1 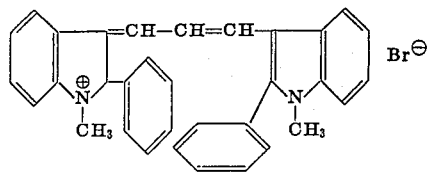 Br⁻
II, 2 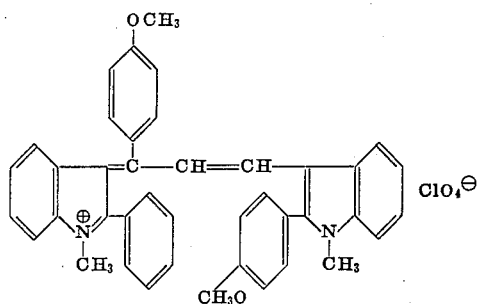 ClO₄⁻
II, 3 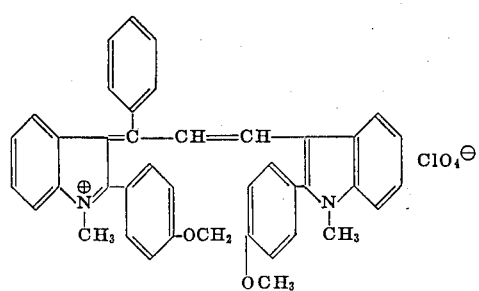 ClO₄⁻
II, 4 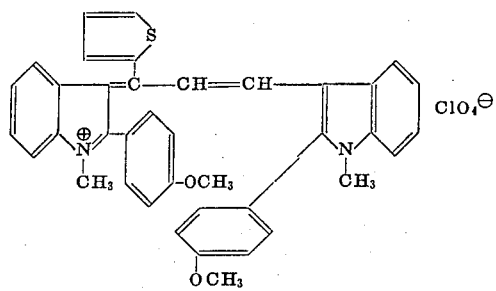 ClO₄⁻
II, 5 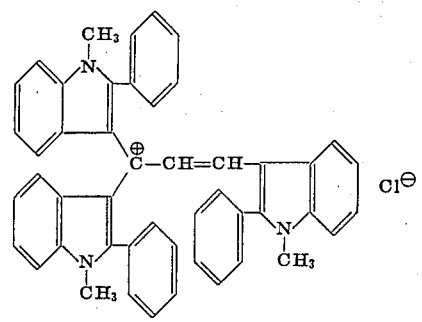 Cl⁻
II, 6 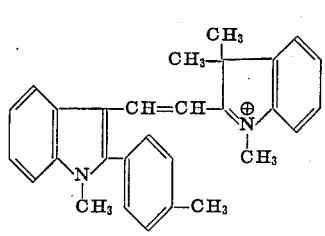
II, 7 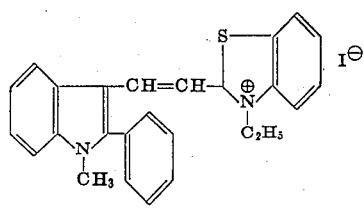 I⁻
II, 8 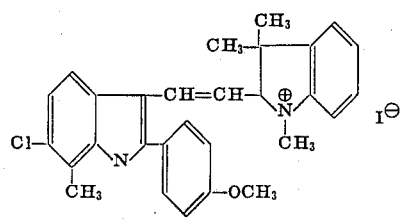 I⁻
II, 9 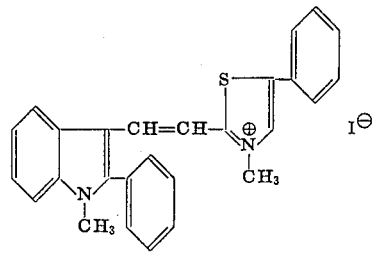 I⁻
II, 10 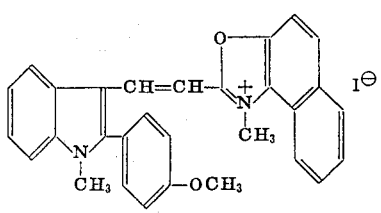 I⁻
II, 11 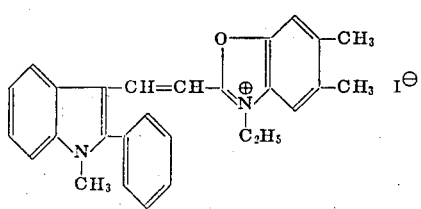 I⁻
II, 12 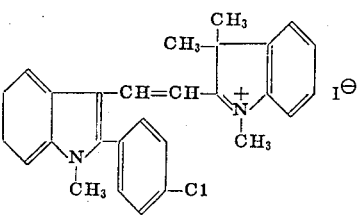 I⁻
II, 13 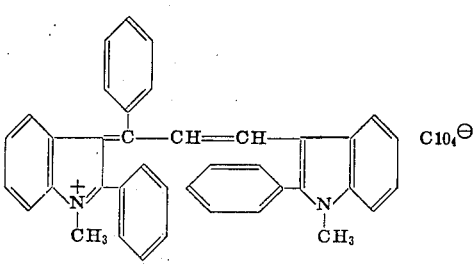 ClO₄⁻

II,14

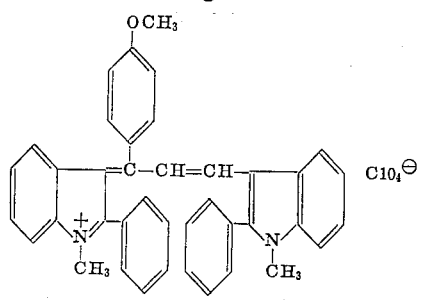

Further indocyanine dyes are e.g., described in the German Pat. Nos. 1,008,118 and 1,153,246.

In normal negative emulsions, the dyes used according to the present invention, that is not only triphenylmethane or indocyanine dyes, but also a mixture of them have practically no sensitizing effect and even reduce the total sensitivity and increase the undesired grey fog. In direct positive emulsions, however, these dyes produce a spectral sensitization of exceptionally high sensitivity and with an excellent steepness of the gradation. The dyes of the combination of the present invention show a good compatibility with each other and with further common additives. An improved and uniform sensitization over the whole range of the visible spectrum is obtained.

This good sensitization is also preserved in the presence of water-soluble or emulsified dye components. Furthermore, the emulsion may contain the usual wetting agents, hardeners, stabilizers, whiting agents and other conventional additives.

The dyes used in the present invention have the further advantage that layers containing them are only slightly colored so that they can be used particularly advantageously with paper emulsions.

The preparation of direct positive emulsions which can be sensitized with a combination of dyes according to the present invention has been described in, inter alia, German Pat. Nos. 606,392 and 642,222 and in British Pats. Nos. 581,773 and 655,009.

Addition of the sensitizers to the direct positive emulsions is carried out in the same way as for negative emulsions. This is done most conveniently just before casting from alcoholic or aqueous solution. Quantities of between 5 and 150, preferably between 5 and 50 mg. of each dye per kg. of emulsion are generally suitable.

EXAMPLE 30 mg. of dye I,16 and 15 mg. of dye II,12 in the form of a 1:1000 solution in methanol are added at 40° C. with stirring to 1 liter of a direct positive silver bromide gelatin emulsion which contains 2.5 mols percent of silver iodide, and the mixture is then digested for 10 minutes. 10 ml. of a 4 percent solution of a wetting agent such as saponin and 25 ml. of a 5 percent solution of mucochloric acid are then added. The emulsion is then cast on a cellulose acetate layer support in the usual manner. The dried layer is exposed to white light in a sensitometer and developed for 5 minutes at 20° C. in developer of the following composition.

p-methylaminophenol—3.5 g.
sodium sulfite anhydrous—60 g.
hydroquinone—9 g.
soda, anhydrous—40 g.
potassium bromide—3.5 g.
make up to 1 liter with water.

Fixing is then carried out in the usual manner. A positive image of the step wedge is obtained with exceptional whites and excellent gradation. The spectral sensitization curve obtained is shown in FIG. 1.

Further suitable combinations of dyes are shown in the following table:

TABLE

| Dye I | quantity | Dye II | quantity | Figure |
|-------|----------|--------|----------|--------|
| I,6   | 15 mg.   | II,12  | 30 mg.   | 2      |
| I,10  | 30 mg.   | II,5   | 15 mg.   | 3      |
| I,1   | 20 mg.   | II,8   | 25 mg.   | 4      |
| I,5   | 15       | II,13  | 30 mg.   | 5      |
| I,5   | 15 mg.   | II,14  | 30 mg.   | 6      |
| I,10  | 30 mg.   | II,14  | 30 mg.   | 7      |
| I,10  | 30 mg.   | —      | —        | 7, dashed line |

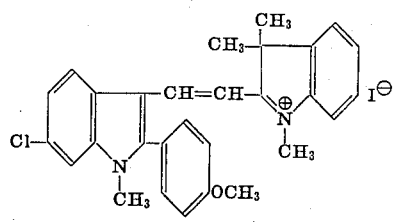
4. The emulsion of claim 1, which contains a dye of the following formula
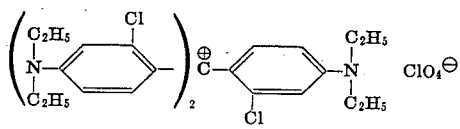
and in addition a dye of the following formula:
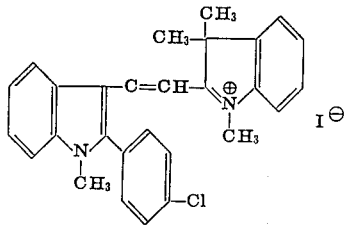
5. The emulsion of claim 1, which contains a dye of the following formula:
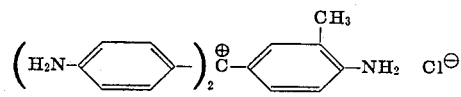
and in addition a dye of the following formula:
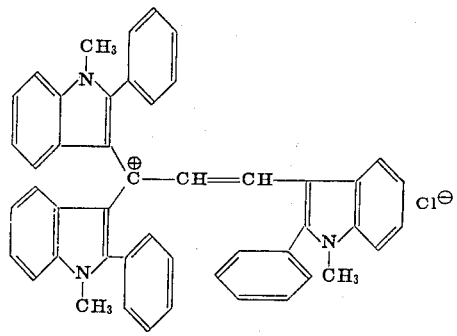
6. The emulsion of claim 1, which contains a dye of the following formula:
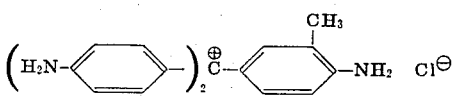
and in addition a dye of the following formula:
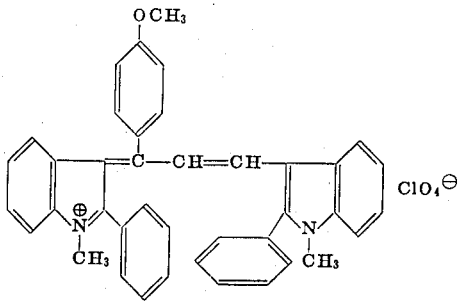

I claim:

1. Optically sensitized photographic direct positive silver halide emulsion which contains (I) a sensitizing dye of the following formula:

I
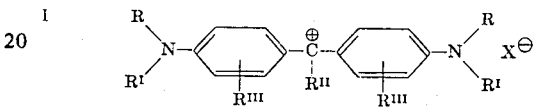

in which R or $R^1$ is a hydrogen atom, an alkyl, hydroxy alkyl or aminoalkyl group with up to six carbon atoms, an aralkyl or aryl group; R and $R^1$ may also denote the ring members required to form a 5- or 6-membered ring;

$R''$ represents an aryl group, which can be substituted in p-position by the groups

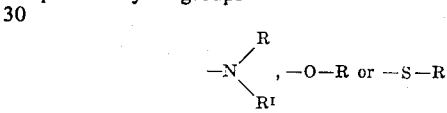

R and $R'$ having the same meanings as mentioned above, and which can be further substituted by the group $R'''$;

$R'''$ represents a hydrogen atom, an alkyl, alkoxy or alkylthio group with up to five carbon atoms, an aroxy group or halogen atom;

$X^1$ is a radical of a halide, sulfate, nitrate, phosphate, alkylsulfate, alkylsulfonate, arylsulfonate, naphthalene sulfonate, oxalate, acetate, thiocyanate, perchlorate or $ZnCl_2$ double salt, and in addition (II) an indocyanine sensitizing dye.

2. The emulsion of claim 1, wherein the indocyanine dye is selected from those having the following formulas;

II
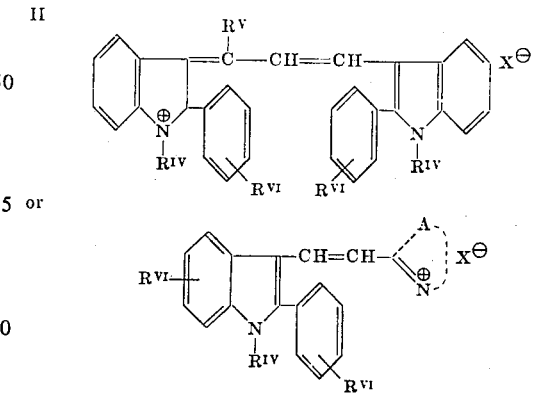

in which
$R''$ represents an alkyl group with up to five carbon atoms;
$R^V$ represents a hydrogen atom, an alkyl group with up to five carbon atoms, a heterocyclic group or a radical of the phenyl series;
$R^{VI}$ stands for a hydrogen atom, an alkyl or alkoxy group, an aryl group or a halogen atom;
A stands for a group required to complete a heterocyclic group having one or more nuclei;
$X^1$ is any organic or inorganic anion.

3. The emulsion of claim 1, which contains a triphenylmethane dye and a dye of the following formula: